United States Patent
Vu et al.

(10) Patent No.: US 10,619,492 B2
(45) Date of Patent: Apr. 14, 2020

(54) VANE AIR INLET WITH FILLET

(71) Applicant: UNITED TECHNOLOGIES CORPORATION, Farmington, CT (US)

(72) Inventors: Ky H. Vu, East Hartford, CT (US); Adam P. Generale, Dobbs Ferry, NY (US); Brandon L. Howard, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 91 days.

(21) Appl. No.: 15/837,784

(22) Filed: Dec. 11, 2017

(65) Prior Publication Data
US 2019/0178091 A1 Jun. 13, 2019

(51) Int. Cl.
    *F01D 5/18* (2006.01)
    *F01D 9/06* (2006.01)
    *F01D 9/04* (2006.01)

(52) U.S. Cl.
    CPC .......... F01D 5/189 (2013.01); F01D 5/187 (2013.01); F01D 9/041 (2013.01); F01D 9/065 (2013.01); *F05D 2240/81* (2013.01); *F05D 2250/51* (2013.01); *F05D 2250/711* (2013.01); *F05D 2260/201* (2013.01)

(58) Field of Classification Search
    None
    See application file for complete search history.

(56) References Cited

U.S. PATENT DOCUMENTS

| 4,218,178 | A | * | 8/1980 | Irwin | F01D 5/185 |
|  |  |  |  |  | 415/114 |
| 7,104,756 | B2 |  | 9/2006 | Harding et al. |  |
| 9,523,283 | B2 |  | 12/2016 | Uechi et al. |  |
| 2009/0162193 | A1 | * | 6/2009 | Mariotti | F01D 5/143 |
|  |  |  |  |  | 415/191 |
| 2010/0310367 | A1 |  | 12/2010 | Devore et al. |  |
| 2012/0257954 | A1 | * | 10/2012 | Chanteloup | F01D 5/187 |
|  |  |  |  |  | 415/1 |

(Continued)

FOREIGN PATENT DOCUMENTS

| EP | 1908921 | 4/2008 |
| EP | 2418355 | 2/2012 |

(Continued)

OTHER PUBLICATIONS

European Patent Office, European Search Report dated Apr. 9, 2019 in Application No. 18198288.5.

*Primary Examiner* — Michael Lebentritt
(74) *Attorney, Agent, or Firm* — Snell & Wilmer, L.L.P.

(57) ABSTRACT

A vane for a gas turbine engine may comprise a vane platform and an airfoil extending radially from the vane platform. The airfoil may comprise an inlet defined, at least partially, by an internal surface of the airfoil. The internal surface may comprise a convex curve proximate the inlet. A transition between an external surface of the airfoil and a surface of the vane platform may comprise a concave curve. A radius of curvature of the convex curve of the internal surface may be concentric to a radius of curvature of the concave curve of the transition.

18 Claims, 4 Drawing Sheets

(56) References Cited

U.S. PATENT DOCUMENTS

| | | | | |
|---|---|---|---|---|
| 2013/0343873 A1* | 12/2013 | Spangler | ............... | F01D 17/162 |
| | | | | 415/115 |
| 2014/0363302 A1* | 12/2014 | Romanowski | .......... | F01D 5/143 |
| | | | | 416/223 R |
| 2015/0110617 A1* | 4/2015 | Stein | ........................ | F01D 5/141 |
| | | | | 415/208.1 |
| 2015/0267549 A1 | 9/2015 | Facchinetti et al. | | |
| 2015/0292343 A1* | 10/2015 | Farah | .................... | F01D 9/044 |
| | | | | 415/209.1 |
| 2016/0194964 A1* | 7/2016 | Vu | .......................... | F01D 5/187 |
| | | | | 60/722 |
| 2016/0208631 A1* | 7/2016 | Spangler | ................. | F01D 9/065 |
| 2016/0222823 A1* | 8/2016 | Vu | .......................... | F01D 9/065 |
| 2016/0237844 A1* | 8/2016 | Holowczak | ............. | F01D 11/04 |
| 2016/0245114 A1* | 8/2016 | Wang | .................... | F01D 25/162 |
| 2016/0258306 A1* | 9/2016 | Spangler | ................. | F01D 9/065 |
| 2017/0009587 A1* | 1/2017 | Szymanski | ............. | F01D 5/141 |
| 2017/0037732 A1* | 2/2017 | Spangler | ................. | F01D 5/187 |
| 2017/0089206 A1* | 3/2017 | Quach | .................... | F01D 5/187 |
| 2017/0130590 A1* | 5/2017 | Spangler | .................. | F01D 5/18 |
| 2017/0159450 A1* | 6/2017 | Buhler | ................... | F01D 5/186 |
| 2018/0223676 A1* | 8/2018 | Spangler | ................. | F01D 5/189 |
| 2018/0283195 A1* | 10/2018 | Ortiz | ....................... | F01D 9/065 |
| 2018/0306036 A1* | 10/2018 | Spangler | ................. | F01D 5/187 |
| 2019/0071984 A1* | 3/2019 | Leon | ........................ | F01D 5/02 |

FOREIGN PATENT DOCUMENTS

| | | |
|---|---|---|
| EP | 2921650 | 9/2015 |
| EP | 3047111 | 7/2016 |
| EP | 3236010 | 10/2017 |

\* cited by examiner

VANE AIR INLET WITH FILLET

STATEMENT OF GOVERNMENT INTEREST

This disclosure was made with government support under Contract No. FA8626-16-C-2139 awarded by the United States Air Force. The government has certain rights in the disclosure.

FIELD

The present disclosure relates to cooling structures for gas turbine engines and, more specifically, to vane cooling structures.

BACKGROUND

A gas turbine engine typically includes a fan section, a compressor section, a combustor section, and a turbine section. The fan section may drive air along a bypass flowpath while the compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. Vanes in the turbine section may be fed cooling air from the bypass flowpath. The cooling air may flow along a platform of the vane and into an internal cavity of the vane airfoil. The geometry of the inlet can cause interrupted or recirculated of the cooling airflow. Additionally, the surfaces forming the inlet may experience increased thermal and mechanical stresses, particularly on a pressure side of the airfoil.

SUMMARY

A vane for a gas turbine engine is disclosed herein, in accordance with various embodiments. The vane may comprise a vane platform and an airfoil extending radially from the vane platform. The airfoil may comprise an inlet defined, at least partially, by an internal surface of the airfoil. The internal surface comprises a convex curve proximate the inlet. A ramp may be formed over a first surface of the vane platform.

In various embodiments, a transition between an external surface of the airfoil opposite the internal surface of the airfoil and a second surface of the vane platform opposite the first surface of the vane platform may comprise a concave curve. A radius of curvature of the convex curve of the internal surface may be concentric to a radius of curvature of the concave curve of the transition.

In various embodiments, the internal surface may comprise an internal pressure side surface of the airfoil, and the ramp may be located proximate a pressure side of the inlet. A transition between the internal pressure side surface of the airfoil and at least one of an internal leading edge surface of the airfoil or an internal trailing edge surface of the airfoil may comprise a concave curve. The internal leading edge surface of the airfoil or the internal trailing edge surface of the airfoil may extend to a radially raised surface of the vane platform.

In various embodiments, the internal surface may comprise an internal suction side surface of the airfoil, and the ramp may be located proximate a suction side of the inlet.

In various embodiments, the inlet may be in fluid communication with an internal cavity of the airfoil. The convex curve of the internal surface and the ramp may provide a smooth flowpath from a generally axial plane along the first surface of the vane platform to a generally radial plane of the internal cavity.

A gas turbine engine is also disclosed herein, in accordance with various embodiments. The gas turbine engine may comprise a combustor and a turbine aft of the combustor and including a vane. The vane may comprise a vane platform and an airfoil extending radially from the vane platform. The airfoil may comprise an inlet defined, at least partially, by an internal surface of the airfoil. The internal surface may comprise a convex curve proximate the vane platform. A ramp may be formed over a first surface of the vane platform In various embodiments, a transition between an external surface of the airfoil opposite the internal surface of the airfoil and a second surface of the vane platform opposite the first surface of the vane platform may comprise a concave curve. A radius of curvature of the convex curve of the internal surface may be concentric to a radius of curvature of the concave curve of the transition.

In various embodiments, the internal surface may comprise an internal pressure side surface of the airfoil. A first transition between the internal pressure side surface of the airfoil and an internal leading edge surface of the airfoil may comprise a first concave curve. A second transition between the internal pressure side surface of the airfoil and an internal trailing edge surface of the airfoil may comprise a second concave curve. In various embodiments, the inlet may be in fluid communication with an internal cavity of the airfoil. The convex curve of the internal surface may reduce stress at a pressure side of the inlet.

A turbine for a gas turbine engine is disclosed herein, in accordance with various embodiments. The turbine may comprise an vane outer platform, a vane inner platform, and an airfoil extending between the vane outer platform and the vane inner platform. The airfoil may comprise an inlet defined, at least partially, by an internal pressure side surface of the airfoil. The internal pressure side surface may comprise a convex curve proximate the inlet.

In various embodiments, a transition between an external pressure side surface of the airfoil and a first surface of the vane outer platform may comprise a concave curve. A radius of curvature of the convex curve of the internal pressure side surface may be concentric to a radius of curvature of the concave curve of the transition. A ramp may extend between the internal pressure side surface of the airfoil and a second surface of the vane outer platform opposite the first surface of the vane outer platform. The convex curve of the internal pressure side surface may reduce stress along a pressure side of the inlet.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "proximate" refers to a direction inwards, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
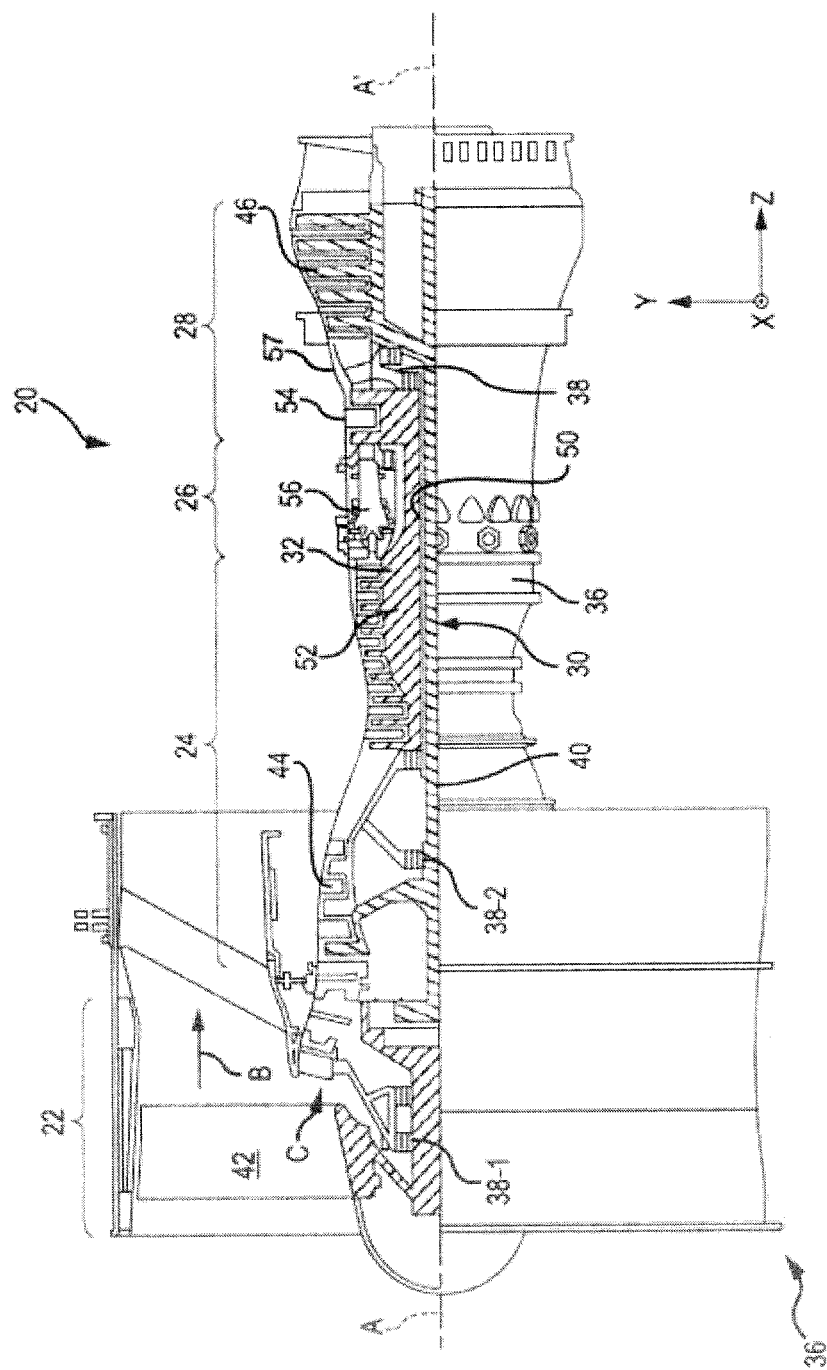
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. High speed spool 32 may comprise an outer shaft 50 that interconnects a high pressure compressor 52 and high pressure turbine 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

Low pressure compressor 44, high pressure compressor 52, low pressure turbine 46, and high pressure turbine 54 may comprise one or more stages or sets of rotating blades and one or more stages or sets of stationary (i.e., non-rotating) vanes axially interspersed with the rotating blade stages.

Figure 2:
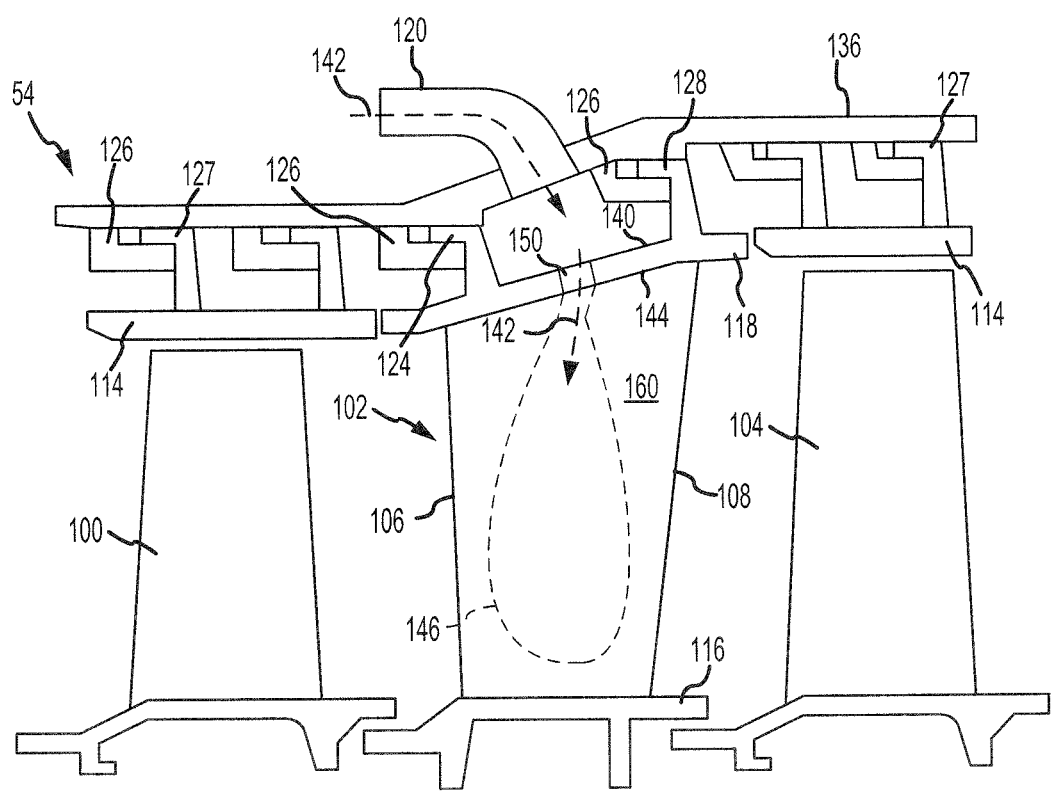
FIG. 2 illustrates a schematic cross-section of a portion of a high pressure turbine section of the gas turbine engine of FIG. 1, in accordance with various embodiments.

FIG. 2 shows a portion of high pressure turbine 54, in accordance with various embodiments. High pressure turbine 54 may include a first rotating member or blade 100, a non-rotating member or vane 102, and a second rotating member or blade 104. Blades 100 and 104 may each be configured to rotate about engine central longitudinal axis A-A', in response to receiving a flow of fluid (e.g., air) from combustor section 26 (FIG. 1). Power from the flow may be converted to mechanical power, or torque, by blades 100 and 104. Blades 100 and 104 may be disposed radially inward of annular blade outer air seals (BOAS) 114.

Vane 102 may be coupled to an engine casing structure 136 or other support structure of high pressure turbine 54. Engine casing structure 136 may form a portion of engine static structure 36 (FIG. 1). Vane 102 may help direct the flow of fluid between blade 100 and blade 104. Vane 102 may comprise a static structure that does not rotate relative to engine central longitudinal axis A-A'. Although the present disclosure is directed the geometry for a cooling inlet for a vane in high pressure turbine 54, one skilled in the art will realize that the cooling inlet geometry disclosed herein may be equally applicable to vanes in low pressure turbine 46, high pressure compressor 52, low pressure compressor 44, and/or other vanes of gas turbine engine 20 (FIG. 1).

Engine casing structure 136 may include case hooks 126. BOAS 114 may be coupled to engine casing structure 136 by BOAS hooks 127 engaging case hooks 126. Vane 102 may be coupled to engine casing structure 136 by forward vane hooks 124 and aft vane hooks 128 engaging case hooks 126.

Vane 102 includes an airfoil 160 that extends between a vane inner platform 116 and a vane outer platform 118. Hot combustion gas from combustor section 26 (FIG. 1) may flow between vane inner platform 116 and vane outer platform 118. Vane 102 may be a stationary vane or a variable vane and could be cantilevered. Airfoil 160 comprises a leading edge 106 and a trailing edge 108. Airfoil 160 further comprises a generally concave pressure side and a generally convex suction side extending between leading edge 106 and trailing edge 108.

Cooling fluid 142, such as bleed air from bypass flow-path B, may be introduced to vane 102 through a turbine cooling air (TCA) pipe 120 at a radially outer diameter of vane 102. TCA pipe 120 may provide cooling fluid 142 to vane outer platform 118 and airfoil 160. In various embodiments, the cooling fluid 142 from TCA pipe 120 may mix with cooling fluid from an upstream source, for example, with fluid flowing aft across BOAS 114 (e.g., between BOAS 114 and engine casing structure 136).

Figure 3A:
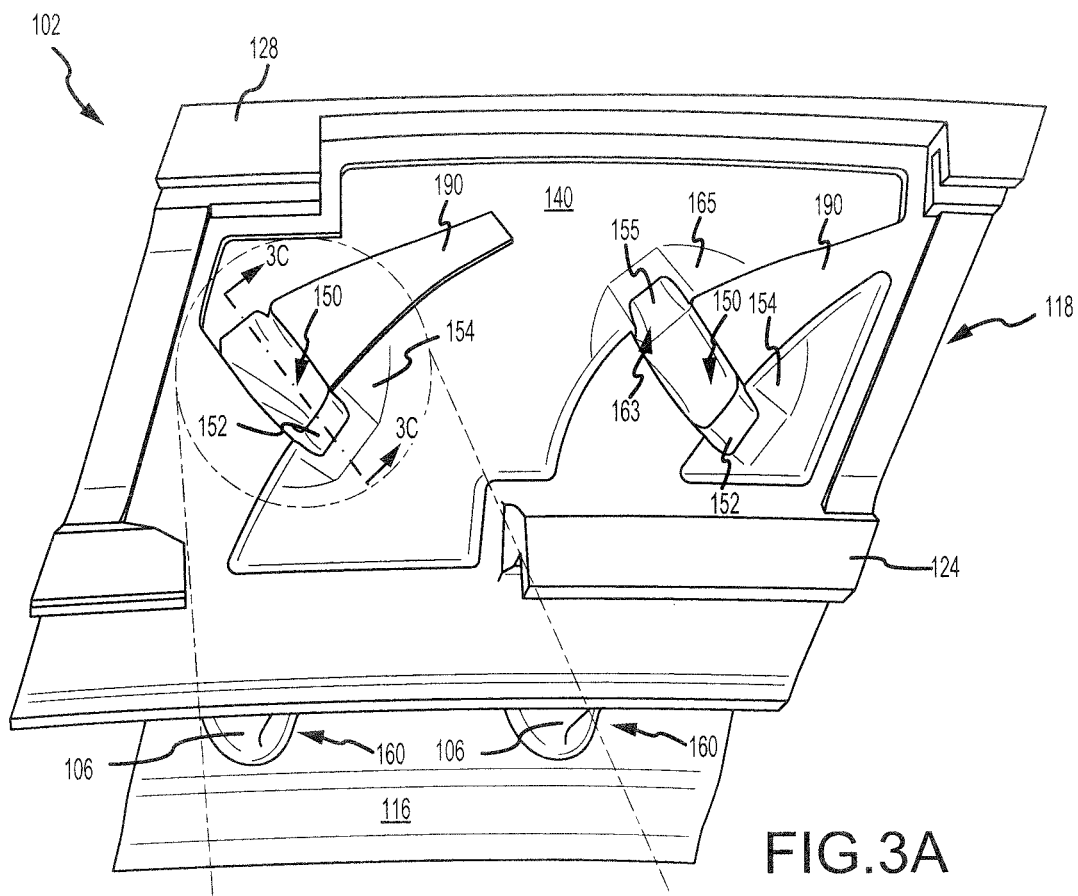
FIG. 3A illustrates a radially inward looking perspective view of a vane, in accordance with various embodiments.

With reference to FIG. 3A, a radially inward looking view of vane 102 is illustrated, in accordance with various embodiments. With combined reference to FIG. 2 and FIG. 3A, vane outer platform 118 comprises a radially outward facing surface 140 and a radially inward facing surface 144. Airfoil 160 extends radially from radially inward facing surface 144 of vane outer platform 118. Vane 102 may further comprise an inlet 150 configured to provide cooling fluid 142 to airfoil 160.

Figure 3B:
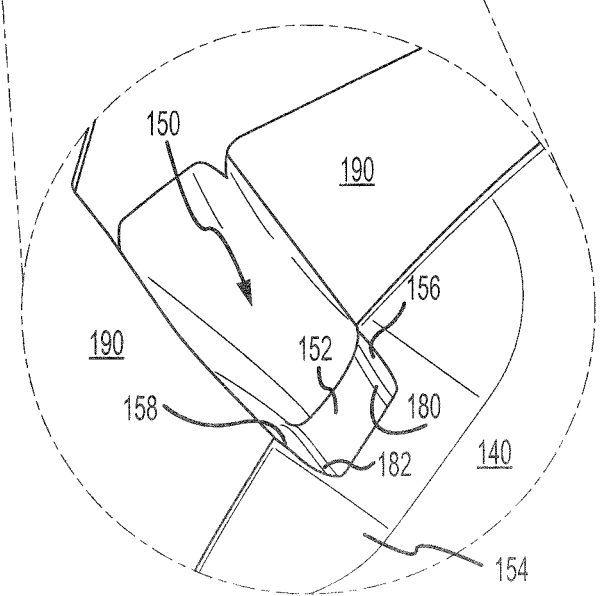
FIG. 3B illustrates an air inlet for an internal cavity vane, in accordance with various embodiments.

FIG. 3B illustrates an inlet 150, in accordance with various embodiments. With combined reference to FIGS. 2 and 3B, inlet 150 may be in fluid communication with an internal cavity 146 of airfoil 160. Cooling fluid 142 may flow into internal cavity 146 of airfoil 160 via inlet 150. For example, cooling fluid 142 from flow from TCA pipe 120, along surface 140 of vane outer platform 118, through inlet 150, and into internal cavity 146.

Figure 3C:
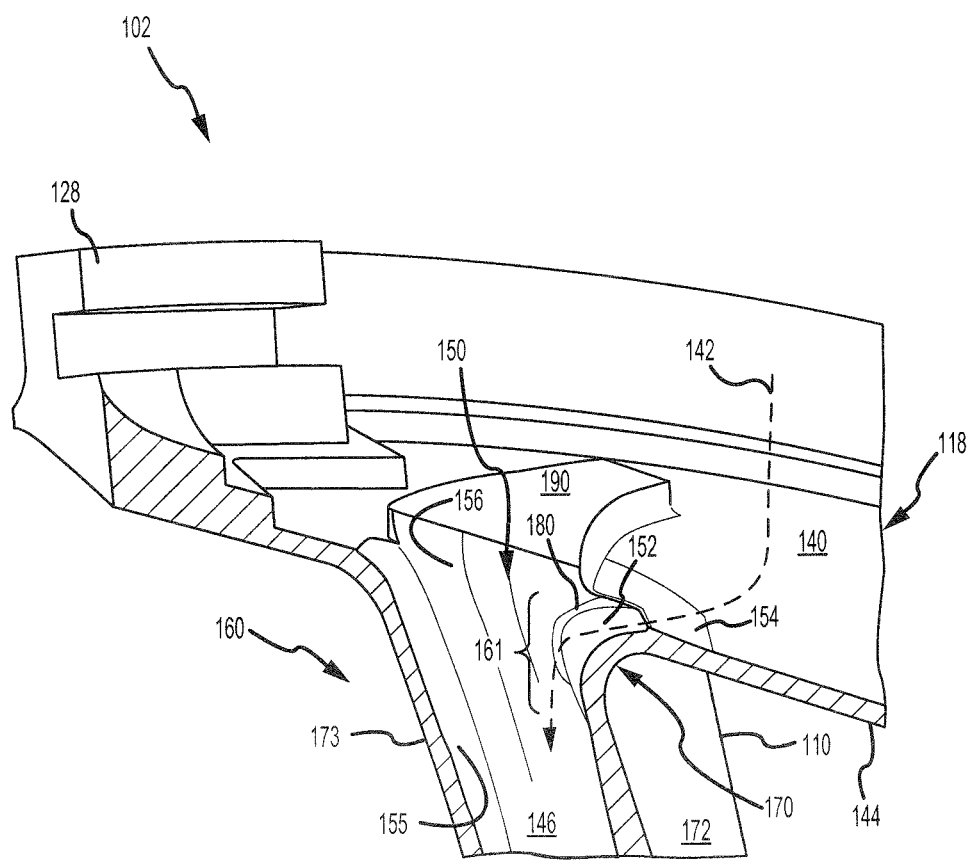
FIG. 3C illustrates a cross-sectional view of a vane taken along the line 3C-3C in FIG. 3A, in accordance with various embodiments.

FIG. 3C illustrates a cross-section view of vane 102 taken on the line 3C-3C in FIG. 3A. With combined reference to FIGS. 3B and 3C, inlet 150 may be defined, at least partially, by an internal pressure side surface 152 of airfoil 160. Internal pressure side surface 152 is oriented away from (i.e., opposite) an external pressure side surface 172 of airfoil 160. Internal pressure side surface 152 may be oriented toward an internal suction side surface 155 of airfoil 160. Internal suction side surface is oriented away from (i.e., opposite) an external suction side surface 173 of airfoil 160. Internal suction side surface 155 may also define a portion of inlet 150. Internal pressure side surface 152 may extend to surface 140 of vane outer platform 118. In various embodiments, internal pressure side surface 152 may extend to a ramp 154 formed over surface 140 of vane outer platform 118. In this regard, a portion of internal pressure side surface 152 may be raised radially with respect to surface 140 of vane outer platform 118. Ramp 154 may comprise a sloped surface extending from surface 140 of vane outer platform 118 to inlet 150 (e.g., to internal pressure side surface 152). The slope of ramp 154 may allow the cooling fluid 142 traveling along surface 140 to travel (i.e., flow) smoothly into inlet 150. Ramp 154 may be located proximate a pressure side of inlet 150. The pressure side of inlet 150 corresponds to the portion of the inlet (e.g., portion 161 of internal pressure side surface 152) located proximate the pressure side of airfoil 160.

A portion 161 of internal pressure side surface 152 proximate vane outer platform 118 may be curved. Stated differently, the portion 161 of internal pressure side surface 152 defining inlet 150 may be curved. For example, portion 161 of internal pressure side surface 152 may comprise a convex curve. In this regard, portion 161 (i.e., the convex curve) may extend between a generally axially oriented portion of internal pressure side surface 152, located proximate surface 140 and/or ramp 154, and a generally radially oriented portion of internal pressure side surface 152, located proximate internal cavity 146. The convex curve of internal pressure side surface 152 may give inlet 150 a bell-mouth shape proximate the pressure side of airfoil 160. Stated differently, a fillet may be formed by internal pressure side surface 152 at a transition from the generally axial plane of vane outer platform 118 to the generally radial plane of airfoil 160.

The fillet (i.e., curve) formed by internal pressure side surface 152 may provide a smooth flowpath between vane outer platform 118 and airfoil 160 such that cooling fluid 142 flowing along surface 140 may flow more easily into inlet 150 and internal cavity 146. The curve of internal pressure side surface 152 may allow cooling fluid 142 to cover (e.g., form a film or blanket over) internal pressure side surface 152 more completely. Stated differently, the curve of internal pressure side surface 152 may tend to reduce occurrences of cooling gaps (i.e., areas not contacted by cooling fluid 142) along internal pressure side surface 152, particularly, proximate to vane outer platform 118. In this regard, the curve of internal pressure side surface 152 may reduce stress along inlet 150, and, in particular, along the portion of inlet 150 proximate the pressure side of airfoil 160. The geometry of inlet 150 may also serve to reduce pressure loss for the internal fluid circuit (e.g., internal cavity 146) and to maintain attachment (i.e., contact) of cooling fluid 142 along the internal walls of airfoil 160, particularly, along the portions of the internal walls where cooling flow 142 transitions from a generally axially oriented flow direction across the vane platform to a generally radially oriented flow direction into inlet 150 and internal cavity 146. Cooling flow 142 maintaining contact with the internal walls of airfoil 160 tends to create a more uniform temperature and heat transfer and/or cooling along airfoil 160. Stated differently, cooling flow 142 maintaining contact with the internal walls of airfoil 160 tends to avoid hot zones (i.e., areas not contacted cooling flow 142), which can increase thermal stresses experienced by vane 102.

A transition 170 between external pressure side surface 172 of airfoil 160 and radially inward facing surface 144 of vane outer platform 118 may be generally curved. For example, transition 170 may comprise a concave curve. In various embodiments, a radius of curvature of the convex curve formed by portion 161 of internal pressure side surface 152 may be concentric to a radius of curvature of the concave curve formed by transition 170. Stated differently, a geometry of the convex curve may complement the geometry of the concave curve.

Inlet 150 may be further defined by a portion of an internal trailing edge surface 156 of airfoil 160 proximate to vane outer platform 118. Inlet 150 also may be defined by a portion of an internal leading edge surface 158 of airfoil 160 proximate to vane outer platform 118. Internal trailing edge surface 156 may be located proximate trailing edge 108 of airfoil 160 as compared to internal leading edge surface 158. Internal leading edge surface 158 may be oriented generally toward internal trailing edge surface 156. In various embodiments, internal trailing edge surface 156 and internal leading edge surface 158 may extend beyond surface 140 in a radial direction. For example, in various embodiments, vane outer platform 118 may comprise a raised surface 190. Raised surface 190 may be a greater radial distance from engine central longitudinal axis A-A' as compared to surface 140 of vane outer platform 118. In various embodiments, the location of raised surface 190 may correspond a location of airfoil 160, and internal trailing edge surface 156 and/or internal leading edge surface 158 may extend to raised surface 190.

A transition 180 between internal trailing edge surface 156 and internal pressure side surface 152 and proximate vane outer platform 118 (e.g., along portion 161 of internal pressure side surface 152) may be curved. For example, transition 180 may comprise a concave curve. Stated differently, transition 180 may form a fillet between internal trailing edge surface 156 and internal pressure side surface 152. A transition 182 between internal leading edge surface 158 and internal pressure side surface 152 and proximate vane outer platform 118 (e.g., along portion 161 of internal pressure side surface 152) may be curved. For example, transition 182 may comprise a concave curve. Stated differently, transition 182 may form fillet between internal leading edge surface 158 and internal pressure side surface 152. In various embodiments, the fillets formed by transitions 180 and 182 may be formed along portion 161 of internal pressure side surface 152. Transitions 180 and 182 may be configured such that internal trailing edge surface 156, internal pressure side surface 152, and internal leading edge surface 158 to form a generally U (or "half pipe") shaped surface at inlet 150. In various embodiments, ramp 154 may be configured to surround the portion of inlet 150 proximate the pressure side of airfoil 160. For example, ramp 154 may extend to the radially raised portion of internal pressure side surface 152 and to the radially raised portions of internal trailing edge surface 156 and internal leading edge surface 158 that are proximate internal pressure side surface 152. Ramp 154 may allow the cooling fluid 142 traveling along surface 140 to travel (i.e., flow) smoothly into inlet 150.

In various embodiments, the suction side of inlet 150 (i.e., the portion of inlet 150 defined by internal suction side surface 155 and the portions of internal trailing edge surface 156 and internal leading edge surface 158 that are proximate internal suction side surface 155) may comprise a geometry similar to the pressure side of inlet 150. For example, with combined reference to FIGS. 3A and 3C, internal suction side surface 155 may extend radially beyond surface 140 and form a convex curve (i.e., fillet) 163 having a radius of curvature that is concentric to the radius of curvature of the transition between radially inward facing surface 144 and external suction side surface 173. In various embodiments, internal suction side surface 155 may extend to a ramp 165, similar to ramp 154, surrounding the portion of inlet 150 proximate the suction side of airfoil 160. In various embodiments, internal trailing edge surface 156, internal suction side surface 155, and internal leading edge surface 158 may form a generally U (or "half pipe") shaped surface at inlet 150. In various embodiments, cooling fluid may be supplied to vane 102 at vane inner platform 116, and inlet 150 may be located through vane inner platform 116.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(t) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A vane for gas turbine engine, comprising:
   a vane platform;
   an airfoil extending radially from the vane platform, the airfoil comprising an inlet defined, at least partially, by an internal pressure side surface of the airfoil, wherein the internal pressure side surface comprises a convex curve proximate the inlet, wherein a first transition between the internal pressure side surface of the airfoil and an internal leading edge surface of the airfoil comprises a first concave curve and a second transition between the internal pressure side surface of the airfoil and an internal trailing edge surface of the airfoil comprises a second concave curve, and wherein the first transition and the second transition are configured such that the internal trailing edge surface, the internal pressure side surface, and the internal leading edge surface to form a U shaped surface at the inlet; and a ramp formed over a first surface of the vane platform.

2. The vane of claim 1, wherein a third transition between an external surface of the airfoil opposite the internal pressure side surface of the airfoil and a second surface of the vane platform opposite the first surface of the vane platform comprises a concave curve.

3. The vane of claim 2, wherein a radius of curvature of the convex curve of the internal pressure side surface is concentric to a radius of curvature of the concave curve of the third transition.

4. The vane of claim 1, wherein the ramp is located proximate a pressure side of the inlet.

5. The vane of claim 1, wherein the at least one of the internal leading edge surface of the airfoil or the internal trailing edge surface of the airfoil extends to a radially raised surface of the vane platform.

6. The vane of claim 1, wherein the ramp is located proximate a suction side of the inlet.

7. The vane of claim 1, wherein the inlet is in fluid communication with an internal cavity of the airfoil, and wherein the convex curve of the internal pressure side surface and the ramp provide a smooth flowpath from a generally axial plane along the first surface of the vane platform to a generally radial plane of the internal cavity.

8. A gas turbine engine, comprising:
a combustor; and
a turbine aft of the combustor and including a vane, the vane comprising:
a vane platform,
an airfoil extending radially from the vane platform, the airfoil comprising an inlet defined, at least partially, by an internal surface of the airfoil, wherein the internal surface comprises a convex curve proximate the vane platform, wherein a first transition between the internal surface of the airfoil and an internal leading edge surface of the airfoil comprises a first concave curve and a second transition between the internal surface of the airfoil and an internal trailing edge surface of the airfoil comprises a second concave curve, and wherein the first transition and the second transition are configured such that the internal trailing edge surface, the internal surface, and the internal leading edge surface to form a U shaped surface at the inlet, and
a ramp formed over a first surface of the vane platform.

9. The gas turbine engine of claim 8, wherein a third transition between an external surface of the airfoil opposite the internal surface of the airfoil and a second surface of the vane platform opposite the first surface of the vane platform comprises a concave curve.

10. The gas turbine engine of claim 9, wherein a radius of curvature of the convex curve of the internal surface is concentric to a radius of curvature of the concave curve of the third transition.

11. The gas turbine engine of claim 8, wherein the internal surface comprises an internal pressure side surface of the airfoil.

12. The gas turbine engine of claim 8, wherein the inlet is in fluid communication with an internal cavity of the airfoil.

13. The gas turbine engine of claim 12, wherein the convex curve of the internal surface reduces stress at a pressure side of the inlet.

14. A turbine for a gas turbine engine, comprising:

an vane outer platform;

a vane inner platform; and an airfoil extending between the vane outer platform and the vane inner platform, the airfoil comprising an inlet defined, at least partially, by an internal pressure side surface of the airfoil, wherein the internal pressure side surface comprises a convex curve proximate the inlet, wherein a first transition between the internal pressure side surface of the airfoil and an internal leading edge surface of the airfoil comprises a first concave curve and a second transition between the internal pressure side surface of the airfoil and an internal trailing edge surface of the airfoil comprises a second concave curve, and wherein the first transition and the second transition are configured such that the internal trailing edge surface, the internal pressure side surface, and the internal leading edge surface to form a U shaped surface at the inlet.

15. The turbine of claim 14, wherein a third transition between an external pressure side surface of the airfoil and a first surface of the vane outer platform comprises a concave curve.

16. The turbine of claim 15, wherein a radius of curvature of the convex curve of the internal pressure side surface is concentric to a radius of curvature of the concave curve of the third transition.

17. The turbine of claim 16, further comprising a ramp extending between the internal pressure side surface of the airfoil and a second surface of the vane outer platform opposite the first surface of the vane outer platform.

18. The turbine of claim 14, wherein the convex curve of the internal pressure side surface reduces stress along a pressure side of the inlet.

* * * * *